(12) United States Patent
Sun (10) Patent No.: US 10,032,291 B2
(45) Date of Patent: Jul. 24, 2018

(54) METHODS AND DEVICES FOR INTERFACE DISPLAY

(71) Applicant: Alibaba Group Holding Limited, Grand Cayman (KY)

(72) Inventor: Chen Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 29 days.

(21) Appl. No.: 15/082,941

(22) Filed: Mar. 28, 2016

(65) Prior Publication Data
US 2016/0292892 A1    Oct. 6, 2016

(30) Foreign Application Priority Data
Mar. 30, 2015    (CN) .......................... 2015 1 0144901

(51) Int. Cl.
| | | |
|---|---|---|
| *G06T 3/00* | (2006.01) | |
| *G06T 11/00* | (2006.01) | |
| *G06F 17/30* | (2006.01) | |
| *H04M 1/725* | (2006.01) | |

(52) U.S. Cl.
CPC .......... *G06T 11/001* (2013.01); *G06T 3/0006* (2013.01); *H04M 1/72519* (2013.01)

(58) Field of Classification Search
CPC ............................. G06F 3/0481; G06F 9/4443
See application file for complete search history.

(56) References Cited

U.S. PATENT DOCUMENTS

| | | | | |
|---|---|---|---|---|
| 6,222,538 | B1 * | 4/2001 | Anderson ............. | G06F 3/0481 715/709 |
| 6,762,767 | B2 * | 7/2004 | Evans ..................... | G06F 9/451 345/581 |
| 9,361,132 | B2 * | 6/2016 | de Souza Lima .... | G06F 3/0481 |
| 2002/0149629 | A1 * | 10/2002 | Craycroft ................ | G06F 9/451 715/861 |
| 2003/0097475 | A1 * | 5/2003 | York ..................... | G06T 11/001 709/246 |
| 2007/0094597 | A1 * | 4/2007 | Rostom ................. | G06F 3/0482 715/700 |
| 2008/0256473 | A1 | 10/2008 | Chakra et al. | |

(Continued)

OTHER PUBLICATIONS

PCT Search Report and Written Opinion dated Jun. 16, 2016 for PCT Application No. PCT/US16/24538, 10 pages.

*Primary Examiner* — Scott Baderman
*Assistant Examiner* — Mario M Velez-Lopez
(74) *Attorney, Agent, or Firm* — Lee & Hayes, PLLC (57) ABSTRACT

The implementations relate to a method and a device for interface display and an electronic device thereof. The method may include acquiring background information of an application page area adjoining to a system bar and configuring background of the system bar based on the background information. The background information may include related information reflecting a background color of the application page area. Therefore, users do not need to perform extra operations such as selecting colors. In addition to simplifying procedures and improving efficiency, the method may further avoid defragmented effects due to inconsistency between tones of the system bar and a control adjoining to the system bar. The method may provide a good visual effect for the users while presenting system information.

18 Claims, 6 Drawing Sheets

(56) References Cited

U.S. PATENT DOCUMENTS

| | | | |
|---|---|---|---|
| 2009/0313550 A1* | 12/2009 | Kim | G06F 17/30 |
| | | | 715/744 |
| 2010/0060547 A1* | 3/2010 | Bloebaum | G06F 1/1624 |
| | | | 345/1.3 |
| 2011/0187737 A1 | 8/2011 | Kumar et al. | |
| 2011/0252344 A1* | 10/2011 | van Os | G06F 9/4443 |
| | | | 715/763 |
| 2012/0047447 A1 | 2/2012 | Haq | |
| 2012/0200586 A1* | 8/2012 | Lima | G06F 9/4443 |
| | | | 345/582 |

* cited by examiner

METHODS AND DEVICES FOR INTERFACE DISPLAY

CROSS REFERENCE TO RELATED PATENT APPLICATIONS

This application claims priority to Chinese Patent Application No. 201510144901.2, filed on Mar. 30, 2015, entitled "Methods and Devices for Interface Display," which is hereby incorporated by reference in its entirety.

TECHNICAL FIELD

Implementations herein relate to interface display technology, and more specifically, to methods and devices for interface display.

BACKGROUND

With the development of the Internet and mobile communication technologies, mobile devices have been increasingly more widely used. The mobile devices provide system information to users, for example, wireless signal strength, network connection status, a battery level etc. The system information is usually presented via a status bar at the top of the interface of a mobile device (hereinafter referred to as a status bar). When a user uses an application installed on the mobile device, the application page of the application is displayed in an area below the status bar. The status bar usually has a fixed color as the background color, while a background color of the application page may be varied. For example, the color of a status bar of an ANDROID® phone is generally black. This results in a situation where the application status bar and background color of the application page are inconsistent and show a fragmented visual effect. This may cause the entire interface to appear inconsistent and poor use experience.

Figure 1:
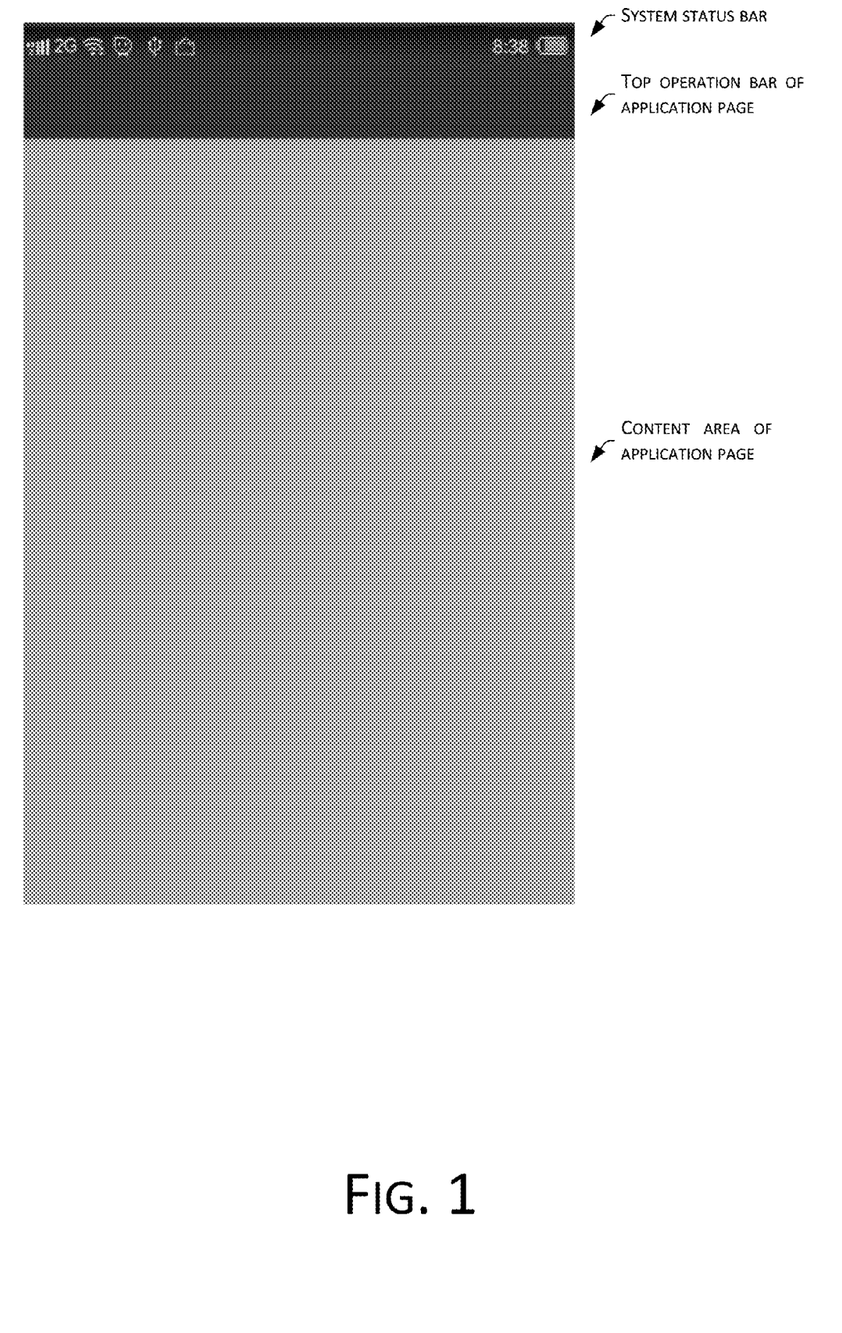
FIG. 1 is a diagram illustrating an immersive effect of a status bar.

To solve the problems above, the background colors of the application and the status bar may be changed to have a consistent visual effect on the interface. This effect is known as an "immersive status bar" effect. There are some third-party plug-ins or tools that provide functions associated with the effect. However, to use these tools or plug-ins, users often have to perform operations such as selecting a background color from a color list or from the interface to achieve a particular immersive effect on the application and the status bar. FIG. 1 is a diagram illustrating an immersive effect of a status bar.

Figure 2:
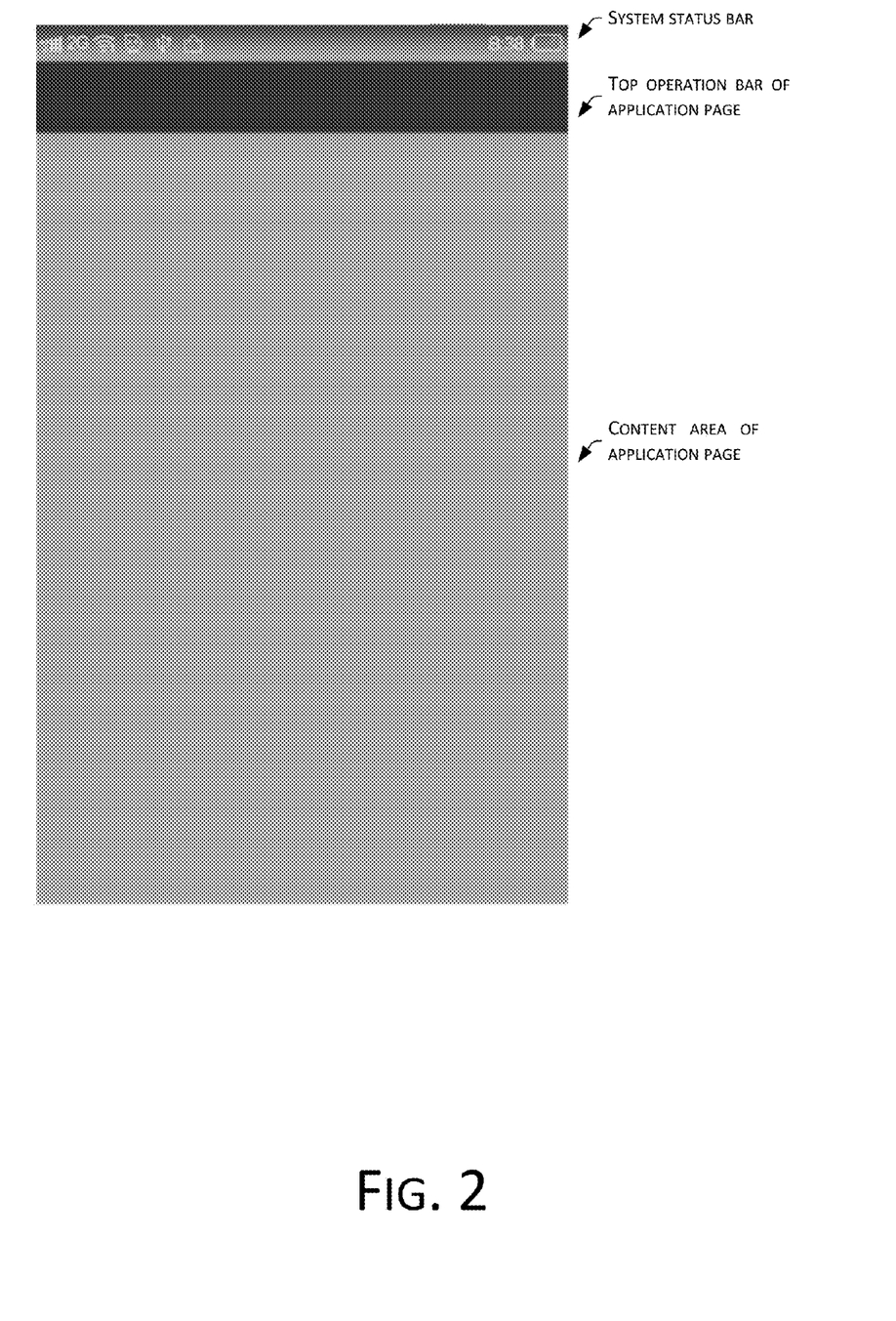
FIG. 2 is a diagram illustrating fragmented rendering between a status bar and an application page using a conventional immersive method.

As illustrated in FIG. 1, to achieve the immersive effect as described above, a user has to perform operations such as selecting color and other operations. These operations are cumbersome and inefficient. In addition, if the user selects the wrong color, a desired immersive effect in the status bar will not be achieved. For example, the background color is not consistent with a top control of the application page area (e.g., ActionBar). If the user does not select the background color of the action bar correctly, the status bar and the application page may appear to be fragmented and the desired immersive effect on the status bar will not be achieved, as illustrated in FIG. 2.

SUMMARY

Implementations herein relate to methods and devices for interface display and to electronic devices. The implementations may solve problems related to immersive effects associated with status bars under current techniques. For example, the problems include complicated procedures that users have to perform, low efficiency, and poor immersive effects. This Summary is not intended to identify all key features or essential features of the claimed subject matter, nor is it intended to be used alone as an aid in determining the scope of the claimed subject matter.

The implementations further relate to a method for interface display. The method includes acquiring, by a computing device (e.g., a mobile device), background information of an application page area adjoining to a system bar. The background information may include related information reflecting a background color of the application page area. The mobile device may configure background of the system bar based on the background information.

In implementations, the mobile device may further monitor replacement of an application page of an application on an interface that is displayed by the mobile device. The mobile device may acquire the background information of the application page area adjoining to the system bar by acquiring the background information of the application page area adjoining to the system bar in response to the replacement of the application page.

In implementations, the mobile device may monitor the replacement of the application page on the interface by monitoring an application opening of the application and/or monitoring a switch between different pages of the application.

In implementations, the mobile device may monitor, via a page management application, display of the replacement of the application page on the interface.

In implementations, the background information may include a background picture or the background color. The mobile device may configure the background of the system bar based on the background information by configuring a background picture or a background color of the system bar based on the background information.

In implementations, the system bar may include a status bar located on a top of the interface, and/or a navigation bar at the bottom of the interface.

In implementations, when the system bar is the status bar located on the top of the interface, the application page area adjoining to the system bar may include a top control of the application page. When the system bar is the navigation bar at the bottom of the interface, the application page area adjoining to the system bar may include a bottom control of the application page.

In implementations, the mobile device may acquire the background information of the application page area adjoining to the system bar by traversing a plurality of controls of the application page, and determining whether an individual control is a control adjoining to the system bar based on information of a display location of the individual control on the interface for each control of the plurality of controls of the application page. If an individual control is the control adjoining to the system bar, the mobile device may acquire the background information of the individual control.

In implementations, when the background information includes a background picture, the mobile device may perform the following operations prior to configuring the background of the system bar based on the background information. For example, the mobile device may process the background picture and make the background picture to be suitable as a background display of the system bar.

In implementations, the mobile device may process the background picture by performing a crop processing on the background picture to make a length and/or height of the background picture consistent with the system bar, performing a stretching processing on the background picture to make the length and/or height of the background picture consistent with the system bar, and/or performing a rotation processing on the background picture.

In implementations, the mobile device may configure the background of the system bar based on the background information by configuring the background picture or the background color of the system bar by calling a background setting interface that is associated with the system bar and provided by a system.

In implementations, the mobile device may configure the background of the system bar based on the background information by setting the background color of the system bar to be transparent, adding a blank control with a same size and at a same position of the system bar, and configuring a background picture or a background color of the blank bar based on the background information.

The implementations further relate to a device for interface display. The device may include an application background acquisition module configured to acquire background information of an application page area adjoining to a system bar. The background information may include related information reflecting a background color of the application page area. The device may further include a system bar background setting module configured to configure a background of the system bar based on the background information.

In implementations, the device may include a page replacement monitoring module configured to monitor replacement of an application page of an application on an interface. The application background acquisition module may be configured to further acquire the background information of the application page area adjoining to the system bar in response to a replaced application page after the page replacement monitoring module detects the replacement of the application page.

In implementations, the page replacement monitoring module may include an application opening monitoring submodule configured to monitor an application opening of the application, and a page switching monitoring submodule configured to monitor a switch between different pages of the application.

In implementations, the page replacement monitoring module may be configured to further monitor, via a page management application, display of the replacement of the application page on the interface.

In implementations, the application background acquisition module may be configured to acquire the background information, such as the background picture or the background color. The system bar background setting module may be configured to configure the background picture or the background color of the system bar based on the background information.

In implementations, the system bar may include a status bar located on the top of the interface, and/or a navigation bar at the bottom of the interface.

In implementations, when the system bar is the status bar located on the top of the interface, the application page area adjoining to the system bar may include a top control of the application page. When the system bar is the navigation bar at the bottom of the interface, the application page area adjoining to the system bar may include a bottom control of the application page.

In implementations, the application background acquisition module may include a traversal control submodule configured to traverse a plurality of controls of the application page, a judgment adjacent submodule configured to determining whether an individual control is a control adjoining to the system bar based on information of a display location of the individual control on the interface for each control of the plurality of controls of the application page, and a background information acquisition submodule configured to acquire background information of an individual control if an output of judgment adjacent submodule is positive.

In implementations, when the background information is the background picture, the device may further include an image processing module configured to process the background picture to adjust the background picture to be suitable as a background display of the system bar before triggering the system bar background setting module.

In implementations, the image processing module may include a crop processing submodule configured to perform crop processing on the background picture to make a length and/or height of the background picture consistent with the system bar, a stretching processing submodule configured to perform stretching processing on the background picture to make the length and/or height of the background picture consistent with the system bar, and/or a rotation processing submodule configured to perform rotation processing on the background picture.

In implementations, the system bar background setting module may be configured to configure the background picture or the background color of the system bar by calling a background setting interface that are associated with the system bar and provided by a system.

In implementations, the system bar background setting module may include a system bar transparent setting submodule configured to set the background color of the system bar to be transparent, a blank control adding submodule configured to add a blank control with a same size and at a same position of the system bar, and a control background setting submodule configured to configure a background picture or a background color of the blank bar based on the background information.

Further, the implementations relate to an electronic device. The electronic device may include a display, one or more processors, and memory configured to store an interface display program, the interface display program executed by the one or more processors to acquire background information of an application page area adjoining to a system bar and to configure background of the system bar based on the background information. The background information may include related information reflecting a background color of the application page area.

As compared with the prior art, one aspect of the present disclosure has the following advantages. The implementations relate to methods for interface display, and the method includes acquiring background information of an application page area adjoining to a system bar and configuring background of the system bar based on the background information. The method may make background of a system bar consistent to rendered effects of the application page area adjoining to the system bar and achieve consistency of an immersive effect of the application page corresponding to the application page area and the system bar.

Further, the method may actively obtain background that is displayed on an interface and is associated with background information of the application area adjoining to the system bar, and adopt the background of the system bar that is configured based on the background information. Therefore, users do not need to perform additional operations such as selecting colors. In addition to simplifying procedures and improving efficiency, the method may further avoid fragmented effects due to inconsistency between tones of the system bar and a control adjoining to the system bar while tones of background of the system bar and a corresponding application page may be consistent.

In implementations, in response to detection of openings of applications and/or a switch of application pages, the method may render an immersive style such that all the application pages automatically become consistent to the system bar and present these application pages to users using the immersive style. The method may provide a good visual effect for the users from a system level.

BRIEF DESCRIPTION OF THE DRAWINGS

The Detailed Description is described with reference to the accompanying figures. The use of the same reference numbers in different figures indicates similar or identical items.

DETAILED DESCRIPTION

In the following description, numerous specific details are set forth in order to fully understand the present application. However, the present application can be implemented in many other ways than those herein described in embodiments. Those skilled in the art can make similar promotion without departing from the present disclosure, and therefore the present disclosure is not limited particular embodiments disclosed below.

Implementations herein relate to a method for interface display, a device for interface display, and an electronic device, as discussed in details below. To facilitate understanding, a description of concepts of the present disclosure is provided below and descriptions of specific embodiments are provided further.

To display device information to users, electronic devices (e.g., a mobile device) usually display a status bar on the top of the interface and provide the device information to the users using icons or text. For example, the device information may include a wireless signal strength, a network connection status, a battery level, a current time etc.

Furthermore, for some electronic devices (e.g., smart phones), to expand a size of a display screen, a device or service provider may remove keys for navigation at the bottom of devices. Instead, virtual key bars for the navigation have been displayed at the bottom of the devices. These virtual key bars may include a return key, a desktop button, a button of a currently or recently used application and other virtual buttons.

The status bar and the navigation bar described above provide services to users from a system level, present system-level information to the users, and/or facilitate the users to perform a system-level operation.

As described herein, a system bar may include a bar or a control that is displayed on an interface of an electronic device and provides services to users from a system level of the electronic device.

The system bar may include, but not limited to a status bar and a navigation bar, as described above. For example, a system section and/or system control that is/are superimposed on an application and is similar to an icon shape also belongs to the system bar as described herein.

On an interface of an electronic device, the electronic device may display an application in addition to the system bar. On a smart phone, for example, an area below a status bar is usually for displaying an area of applications.

An application typically contains or generates multiple application pages, and each page may contain one or more controls. For example, to facilitate users to switch between different pages of the application, the application may generate an operation bar (e.g., ActionBar) located on the top of an application page.

The operation bar may be used to navigate between multiple pages of a hierarchical structure and manage page information. The area located below the operation bar of the application page is a content area of the application page.

As described herein, background information of an application page area adjoining to a system bar refers to background information of a part of the application area adjoining to the system bar on visual effects.

In a status bar, for example, if an ActionBar control is displayed at the top of the application page, the background information of the application page area adjoining to the system bar refers to background information of the ActionBar control. If the ActionBar control or other controls is/are not displayed at the top of the application page, the background information of the application page area adjoining to the system bar refers to background information of the application page.

The background information may include related information reflecting a background color of the application page area. The background information may include, but is not limited to, a background picture, a background color, and information embodying another background color that may be obtained from another application page area.

The implementations are described in detail below. Mobile devices have been used widely, and a status bar is a common system bar of the mobile devices. To facilitate understanding, the present disclosure includes implementations related to immersion of a status bar. Other devices may be implemented by the present disclosure.

Figure 3:
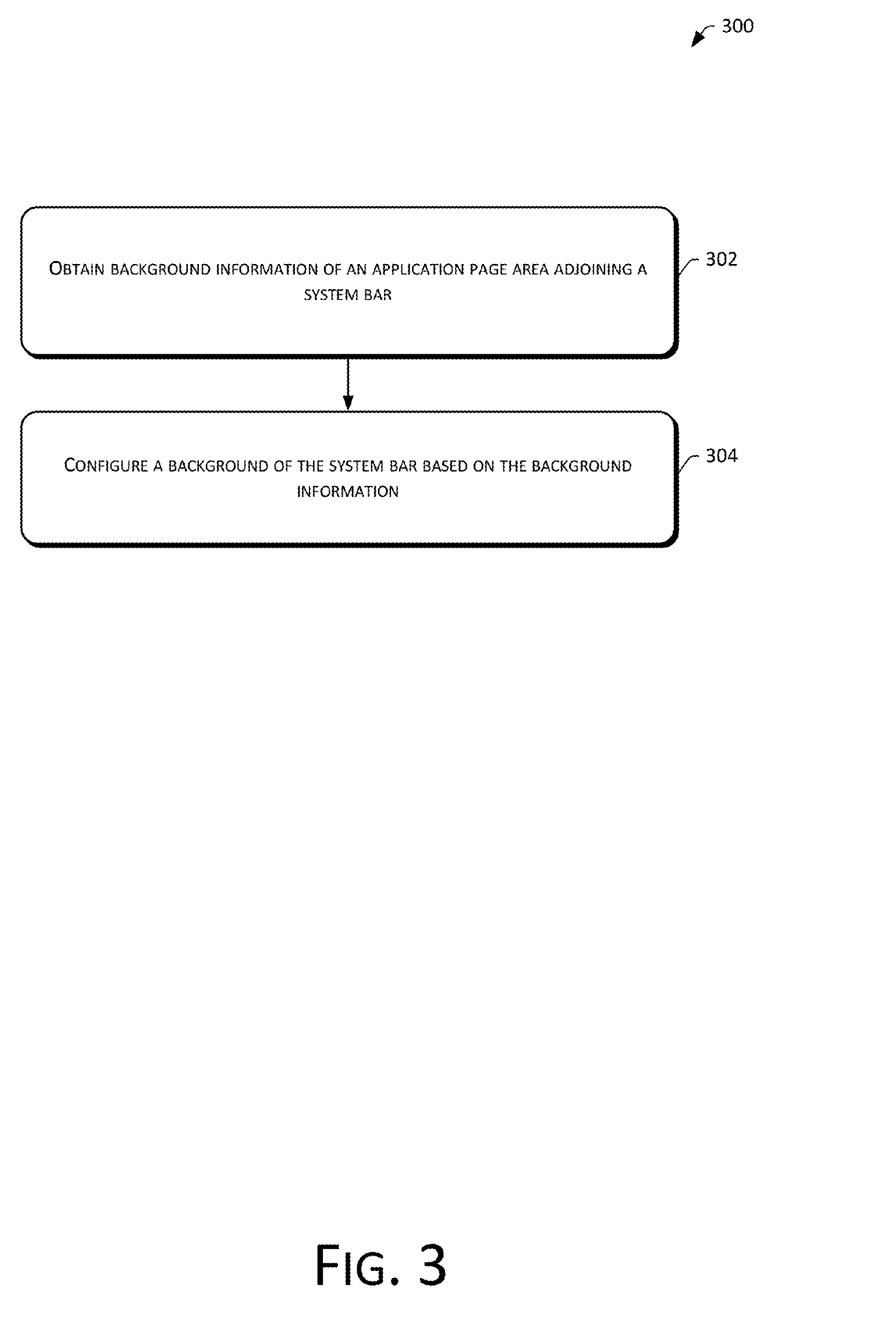
FIG. 3 is a flow chart of an illustrative process for interface display.

FIG. 3 is a flow chart of an illustrative process for interface display. At 302, a mobile device may acquire background information of an application page area adjoining to a system bar (e.g., a status bar), and at 304 configure background of the system bar based on the background information. The implementations may achieve consistency of an immersive effect of an application page corresponding to the application page area and the system bar without extra operations performed by a user.

In implementations, the mobile device may automatically present the application page using an immersive style of the status bar when the application is initiated or application pages are switched. The mobile device may monitor replacement of the application page and perform acquiring and configuring operations, as described above, in response to detection of the replacement. The implementations may provide a good visual effect for the users from a system level.

In implementations, the process 300 may further include the following operations.

Figure 4:
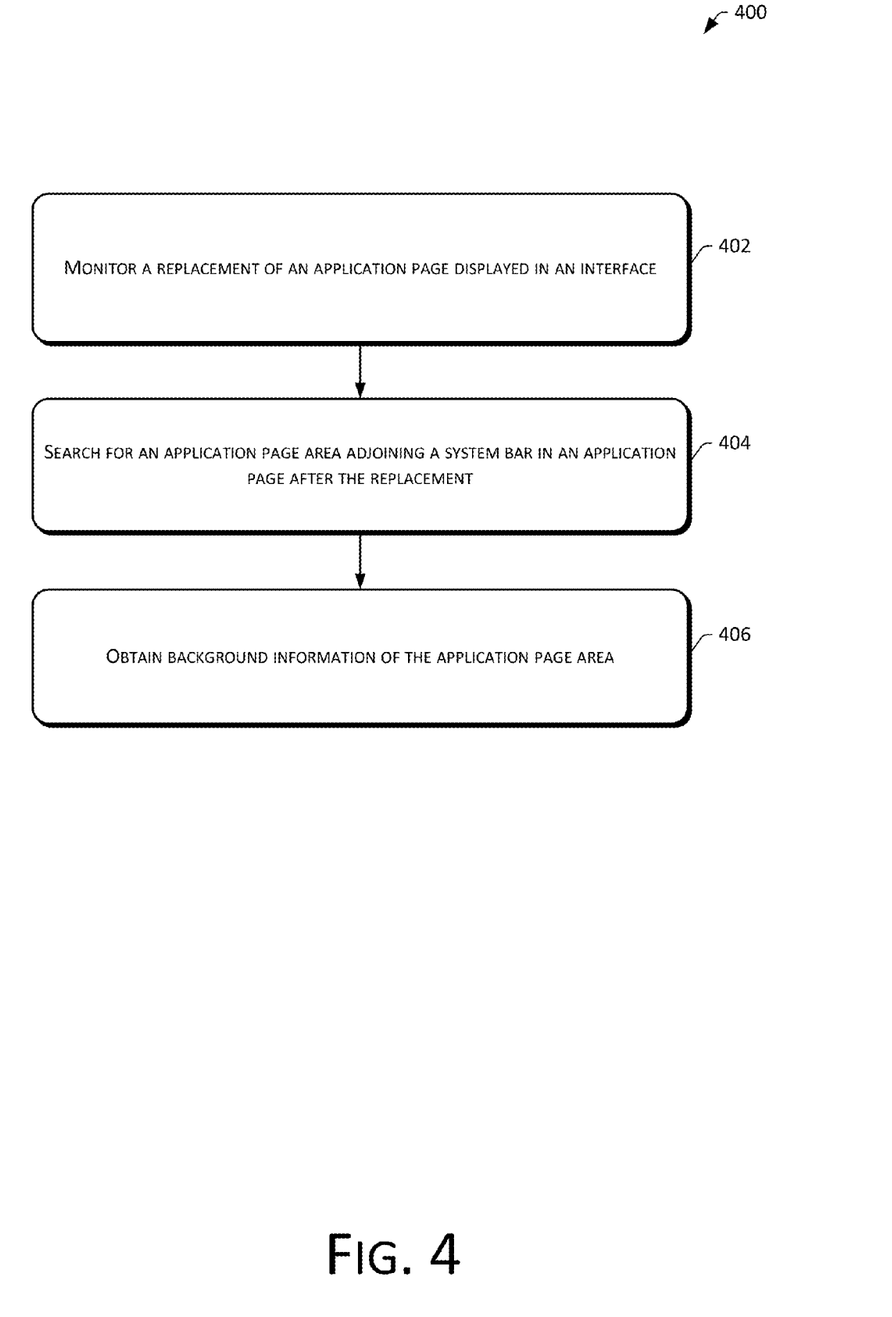
FIG. 4 is a flow chart of an illustrative process for acquiring background information of an application page area adjoining to a system bar.

As illustrated in FIG. 4, at 402, the mobile device may monitor replacement of an application page of an application on an interface. The application is installed on a mobile device and may open one or more application pages. If the application opens more application pages, these pages are usually organized according to a certain hierarchy and may switch between different levels. If a user clicks an application icon on the mobile device, the mobile device may open an application and display a first application page of the application on the current interface. If the user clicks a control or a button for performing a page jump in the application that is currently running, the mobile device may switch between application pages of different levels of the application. This replacement of the application that is displayed on the interface may be monitored accordingly. The replacement may be caused by an initiation of the application or a switch of application pages of the application that is currently running.

In implementations, the mobile device may monitor, via a page management application of the mobile device, display of the replacement of the application page on the interface. The page management program usually refers to a service monitoring program configured to manage application pages and run in background. For example, in ANDROID® smart phones, this function may be implemented by a page manager.

In implementations, each application installed in the smart phone may register pages of the application to a system of the mobile device and obtain a string as an identifier of each individual application page, namely, the address of the application page. When a user opens an application or switch application pages of the application, the page manager usually receives a corresponding message from the application. The page manager renders the corresponding page based on the received message. The page manager may display the first page of the application in response to opening the application. The page manager may display a replaced application page in response to switching of the application pages. In these instances, when the page manager receives the message and performs corresponding interface display, an event of replacement of application pages is detected.

In implementations, the mobile device may perform the following operations when detecting the opening of the application or switching of the application.

In implementations, the mobile device may monitor these two types of replacement of applications pages and may perform the following operations on an application page that is currently displayed and in response to detecting of the replacement of the application pages.

The implementations may render an immersive style such that all the application pages automatically become consistent to the system bar and present these application pages to s user using the immersive style and provide a good virtual effect in a system level.

At 404, the mobile device may locate an application page area adjoining to the system bar on the replaced application page. The application page currently displayed is the replaced application page because the replacement of the application page is detected in the operation 402.

The mobile device may locate the application page area adjoining to the system bar in the current application page and obtain background information of the application page area. The implementations utilize a traversing control to locate the application page area.

As described above, the application page may include multiple controls such as an operation bar, a button, a text section etc. And to facilitate the management, these controls are usually grouped together using a tree structure of the application page. Therefore, this operation may be used recursively to traverse each control of the tree structure starting from the root node of the tree structure.

For an individual control of the multiple controls of the application page, the mobile device may determine whether the individual control is a control adjoining to the system bar based on information of a display location of the individual control on the interface.

In implementations, the mobile device may determine whether a length of the control is less than a length of the interface during the process of traversing and for each control that is currently found. If the length of the control is less than the length of the interface, the mobile device may acquire the background information of the individual control. The mobile device may further extract from a y coordinate of an upper left corner (e.g., vertical coordinate) of the individual control and calculate the difference between the y coordinate and a y coordinates of a lower left corner of a status bar.

After the traversal as described above, the mobile device may select a control having the lowest difference among the multiple traversed controls, namely the control located closest to the status bar. The control is a top control of the application page adjoining to the status bar.

In an example, the mobile device may determine that more than one control has the lowest difference. This may indicate that these controls are overlapped in the application page. The mobile device may further determine a height (i.e., a size of the control in a vertical direction) of each control to select a control from these controls. The control having a lower value of the height usually overlays on other controls. Therefore, the mobile device may select a control having a lowest value of the height as the top control of the application page adjoining to the status bar.

It should be noted that the application page area adjoining to the status bar may be the application itself if the application page does not include a top control. This is because the application page is usually the topmost control of the tree structure.

At 406, the mobile device may acquire the background information of the located application page area. For example, the mobile device may acquire the background information of the individual control and acquire the background information of the application page area after locating/finding the application page area. For example, the mobile device may obtain the information through an interface provided by a system platform of the mobile device.

For example, under control of an ANDROID® system, in response to a determination that the top control adjoining to the status bar is found at 404, background information of the control may be obtained by invoking an interface provided by the system for the control at 406. In some implementations, the following two operations may be included: calling getBackground( ) or a similar interface to obtain a background picture configured for the control and calling getBackgroundColor( ) or an interface similar thereto to obtain a background color configured for the control.

In implementations, the control may include information of the background picture or the background color. In these instances, a strategy may be implemented to attempt to obtain the configured information as described above. For example, the mobile device may attempt to acquire the background picture first. If the mobile device fails to acquire the background picture, the mobile device may continue to acquire the background color. Alternatively, the mobile device may try to acquire the background color first. If the mobile device fails to acquire the background color, the mobile device may continue to acquire the background picture. If the mobile device acquires the background picture, the mobile device may perform information processing and configure a background picture of the status bar using the acquired background information.

Accordingly, the next operation may include copying the background picture. Then, the mobile device may use the copied background picture for further desired processing and configuration at 304. The operations from 402 to 406 provide implementations for acquiring the background information of the application page area adjoining to the status bar through a traversal control. Other methods may be implemented to acquire the background information, for example, using screenshotting.

In implementations, the mobile device may acquire a picture of the application page displayed on the current interface using screenshotting. The mobile device may obtain a top picture from the top of the picture based on the conventional size of the top control of the application page.

The mobile device may then read color values of a predetermined amount (e.g., 20 or 50) of pixels from the picture. The mobile device may cluster the pixels based on the color values of these pixels and place the pixels having the color values within a certain range into a category. The mobile device may select a category that contains the greatest number of pixels and calculate an average color value of the pixels in the category. The mobile device may apply the calculated color value to the background color of the application page area adjoining the status bar. The mobile device may fill a color having the calculated color value into the obtained top picture and then configure the top picture as the background picture of the application page area adjoining to the status bar.

At 304, the mobile device may configure background of the system bar based on the background information. In implementations, the mobile device may acquire the background picture as the background information at 302, and the size of the background picture may be different from the size of the status bar. In these instances, the configuration may fail if the acquired background picture is configured as the background picture of the status bar. Even the configuration is successful, the display effect may not be desired. In these instances, the mobile device may perform processing on the background picture such as to make the sizes of the background picture and the status bar consistent and therefore make the background display of the status bar to appear appropriate.

The processing of the background picture may include various types of processing such as crop processing, stretching processing, and crop processing. Below these types of processing are described separately.

1) Crop processing. If the size of the acquired background picture at the operation 301 is greater than the size of the status bar, the mobile device may perform the crop processing to make the width (in the horizontal direction of size) and/or height (in the vertical direction size) of the background picture consistent with those of the status bar.

For example, the width of the background picture obtained from the top control is consistent with the width of the status bar, and the height of the background picture is greater than the height of the status bar. In these instances, the crop processing may be implemented to make the heights of the background picture and the status bar consistent with each other. Depending on system platforms of the mobile terminal device, different system interfaces may be called to perform the crop processing.

For example, the present disclosure may be implemented using JAVA® development language on ANDROID® system. In these instances, the background picture obtained at the operation 302, information of a start position of the crop processing, the height and/or width of the background picture after the crop processing may be used as entry parameters.

For example, the mobile device may call a method related to Bitmap category (e.g., createBitmap ( )) to configure the height as well as the width of the background picture after the crop processing to be consistent with those of the status bar.

2) Stretching processing. This type process is similar to the crop processing as described above. In some implementations, the size of the acquired background picture at the operation 302 is less than the size of the status bar. In these instances, the stretching processing may be implemented to make the heights and/or widths of the background picture and the status bar to be consistent with each other.

For example, the present disclosure may be implemented using JAVA® development language on ANDROID® system. To achieve the stretching operation of the background picture, the mobile device may calculate a ratio between the widths of the background picture and the status bar, a ratio between the heights of the background picture and the status bar to obtain a stretching ratio for the stretching processing.

The mobile device may further apply the stretching ratio to calculation of a matrix. Further, the background picture obtained at the operation 302, information of a start position of the stretching processing, the height and/or width of the background picture after the stretching processing, and the matrix may be used as entry parameters.

For example, the mobile device may call a method related to Bitmap category (e.g., createBitmap ( )) to make the height and the width of the background picture after the stretching processing to be consistent with those of the status bar.

3) Rotation processing. For some background pictures having specific patterns, the top and bottom edges of the background pictures may be asymmetrical. In these instances, the configuration may fail if the acquired background picture is configured as the background picture of the status bar. Therefore, the mobile device may perform the rotation processing on the background picture such as to improve the display effect.

For example, the mobile device may perform a 180-degree rotation and configure the rotated background picture to make the rotated background picture as the background of the status bar such that patterns at adjoining parts appear consistent.

For example, the present disclosure may be implemented using JAVA® development language on ANDROID® system. To perform the rotation processing of the background picture, the mobile device may generate a rotation matrix and set a rotation angle for the matrix (e.g., 180 degree). In these instances, the background picture obtained at the operation 302, information of a start position of the crop processing, the height and/or width of the background picture after the crop processing and the rotation angle for the matrix may be used as entry parameters. For example, the mobile device may call a method related to Bitmap category (e.g., createBitmap( )) to obtain the background picture after the rotation processing.

These three types of processing may be used independently or in combination. For example, the mobile device may perform the crop processing and then the rotation processing. The mobile device may further make some changes to the processing in addition to these three types of processing. For example, if the size of the background picture is not consistent with the size of the status bar, the mobile device may perform the stretching processing directly. The mobile device may set the configuration of the matrix as the corresponding stretching ratio such as to stretch or narrow accordingly to obtain the background picture.

In addition, if the size of the background picture is less than the size of the status bar, the mobile device may perform splicing processing to make the sizes of the background picture and the status bar consistent. Other various methods may be used to make the sizes of the background picture and the status bar consistent.

After acquiring the background information or processing the background picture, the mobile device may configure the background of the status bar based on the background information. In these instances, two methods may be implemented.

1) Calling system interface. If the system platform of the mobile device provides an interface for configuring a background picture or a background color, this operation may use the acquired background picture or the background color as the entry parameter and call the interface directly to implement the background configuration.

2) Adding bottom control. If the system platform does not provide the interface, a bottom control may be added. In some implementations, the mobile device may set the background color of the system bar to be transparent. For example, in ANDROID® system, the following methods may be implemented: getWindow( ).addFlags(WindowManager.LayoutParams.FLAG_TRANSLUCENT_STATUS), and then add a blank control with a same size and at a same position of the system bar.

The mobile device may then configure the background picture or the background color of the blank bar based on the background information. The blank control refers to a control not displaying foreground information such as text, strings etc.

For example, in ANDROID® system, if the background information includes the background picture, the background picture may be set as the entry parameter. The mobile device may call a function such as setBackgroundDrawable( ) or SetBackgroundResource( ) to configure the background picture as the background of the blank control. If the background information includes the background color, the background color may be set as the entry parameter. The mobile device may call a function such as setBackgroundColor( ) to configure the background color as the background color of the blank control.

The status bar is at the topmost position of the interface. In other words, the status bar is superimposed on top of the new controls, and the status bar has been set to a transparent background. Therefore, an icon and text message of the status bar may be displayed and superimposed on the background picture or the background color of the newly added control. The mobile device may obtain the background picture or the background color of the application page area adjoining to the status bar. Therefore, the background colors or background pictures of the status bar and the application page area adjoining thereto become the same, thus achieving immersive effects on the status bar.

The implementations are described in detail through operations 302 to 304. In implementations, the mobile device may determine whether the background information is obtained successfully after the operation 302. For example, after utilizing a traversing control to locate the application page area, the mobile device may obtain the background picture or the background color of the top control by calling the system interface. If a return value indicates failure or a return point is a null point, the mobile device may determine that the operations are not successful and that the top control is not configured with the background color or the background picture. In these instances, the mobile device may not implement the operation 304.

It should be noted that the present implementations are described using immersive effects on status bars, and other system bars may also be used to describe the immersive effects on the other systems bar.

For example, the interface of the mobile device may include a status bar and a navigation bar located on the bottom of the interface. In these instances, the mobile device may obtain the background information of the application page area adjoining to the status bar (e.g., the top control) and obtain the background information of the application page area adjoining to the navigation bar (e.g., the bottom control) at 302. If the mobile device obtains the background information associated with status bar and the navigation bar, the mobile device may configure the backgrounds of the status bar and the navigation bar based on the foregoing background information at 304, thereby achieving immersive effects on the status bar and the navigation bar.

In summary, the implementations relate to methods and devices for interface display. These implementations are able to make background of a system bar consistent to rendered effects of an application page area adjoining to the system bar and achieve consistency of an immersive effect of an application page corresponding to the application page area and the system bar.

Further, the implementations may proactively obtain background that is displayed on an interface and is associated with background information of the application area adjoining to the system bar. The implementations may further adopt the background of the system bar that is configured based on the background information. Therefore, users do not need to perform extra operation such as selecting colors. In addition to simplifying procedures and improving efficiency, the implementations may further avoid defragmented effects due to inconsistency between tones of the system bar and a control adjoining to the system bar, while tones of backgrounds of the system bar and a corresponding application page may be consistent with each other. In response to detection of openings of applications and/or a switch of application pages, the implementations may render an immersive style such that all the application pages automatically become consistent to the system bar and present these application pages to users using the immersive style. The implementations may provide a good visual effect to the users from a system level.

The implementations relate to a method for interface display. Corresponding to the method, the implementations further relate to a device for interface display.

Figure 5:
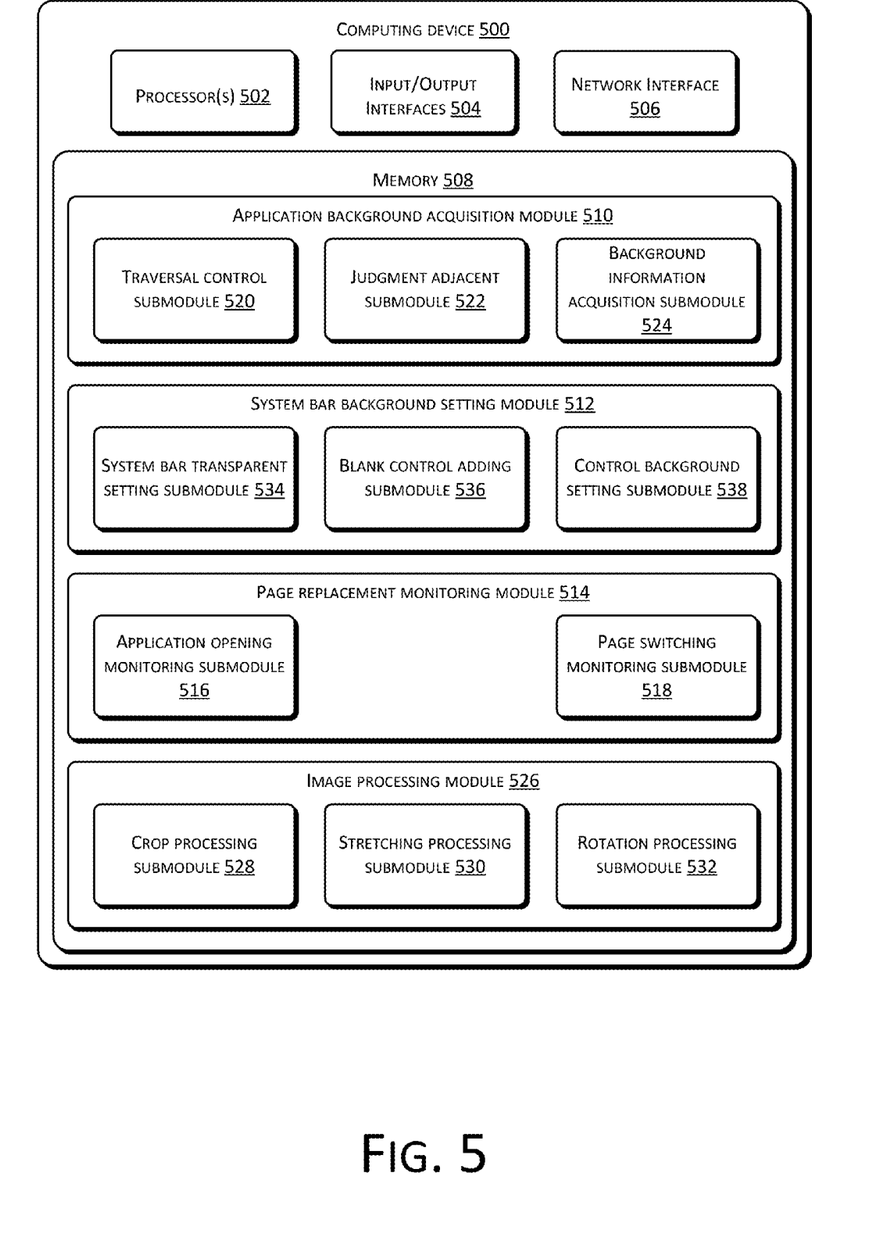
FIG. 5 is a schematic diagram of an illustrative device for interface display.

FIG. 5 is schematic diagrams of an illustrative computing device 500 for interface display. Since the device is substantially similar to the exemplary method, a relatively simple description follows, referring to parts of the implementations related to the method for interface display.

The computing device 500 may be a user device or a server for a multiple location login control. In an exemplary configuration, the computing device 500 includes one or more processors 502, input/output interfaces 504, network interface 506, and memory 508.

The memory 508 may include computer-readable media in the form of volatile memory, such as random-access memory (RAM) and/or non-volatile memory, such as read only memory (ROM) or flash RAM. The memory 508 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 508 in more detail, the memory 508 may include an application background acquisition module 510 and a system bar background setting module 512.

The application background acquisition module 510 may be configured to acquire background information of an application page area adjoining to a system bar. The background information may include related information reflecting a background color of the application page area.

The system bar background setting module 512 may be configured to configure the background of the system bar based on the background information.

In implementations, the device 500 may further include a page replacement monitoring module 514 configured to monitor replacement of an application page of an application on an interface. The application background acquisition module 510 may further acquire the background information of the application page area adjoining to the system bar in response to replacement of the application page after the page replacement monitoring module 514 detects the replacement of the application page.

In implementations, the page replacement monitoring module 514 may include an application opening monitoring submodule 516 configured to monitor an application opening of the application and a page switching monitoring submodule 518 configured to monitoring a switch between different pages of the application.

In implementations, the page replacement monitoring module 514 may be configured to further monitor, via a page management application, display of the replacement of the application page on the interface.

In implementations, the application background acquisition module 510 may further acquire the background information such as a background picture or the background color. The system bar background setting module 512 may configure the background picture or the background color of the system bar based on the background information.

In implementations, the system bar may include a status bar located on a top of the interface, and/or a navigation bar at the bottom of the interface.

In implementations, when the system bar is the status bar located on the top of the interface, the application page area adjoining to the system bar may include a top control of the application page. When the system bar is the navigation bar at the bottom of the interface, the application page area adjoining to the system bar may include a bottom control of the application page. In implementations, the application background acquisition module 510 may include a traversal control submodule 520 configured to traverse multiple controls of the application page, a judgment adjacent submodule 522 configured to determining whether an individual control is a control adjoining to the system bar based on information of a display location of the individual control on the interface for the individual control of the multiple controls of the application page, and a background information acquisition submodule 524 configured to acquire the background information of the individual control if an output of the judgment adjacent submodule 522 indicates an affirmative result.

In implementations, when the background information is the background picture, the device 500 may further include an image processing module 526 configured to process the background picture and make the background picture to be suitable as a background display of the system bar before triggering the system bar background setting module 512.

In implementations, the image processing module 526 may include a crop processing submodule 528 configured to perform crop processing on the background picture to make a length and/or height of the background picture consistent with the system bar, a stretching processing submodule 530 configured to perform stretching processing on the background picture to make the length and/or height of the background picture consistent with the system bar, and/or a rotation processing submodule 532 configured to perform rotation processing on the background picture.

In implementations, the system bar background setting module 512 may be configured to configure the background picture or the background color of the system bar by calling a background setting interface associated with the system bar and provided by the device 500.

In implementations, the system bar background setting module 512 may include a system bar transparent setting submodule 534 configured to set the background color of the system bar to be transparent, a blank control adding submodule 536 configured to add a blank control with a same size and at a same position of the system bar, and a control background setting submodule 538 configured to configure a background picture or a background color of the blank bar based on the background information.

Figure 6:
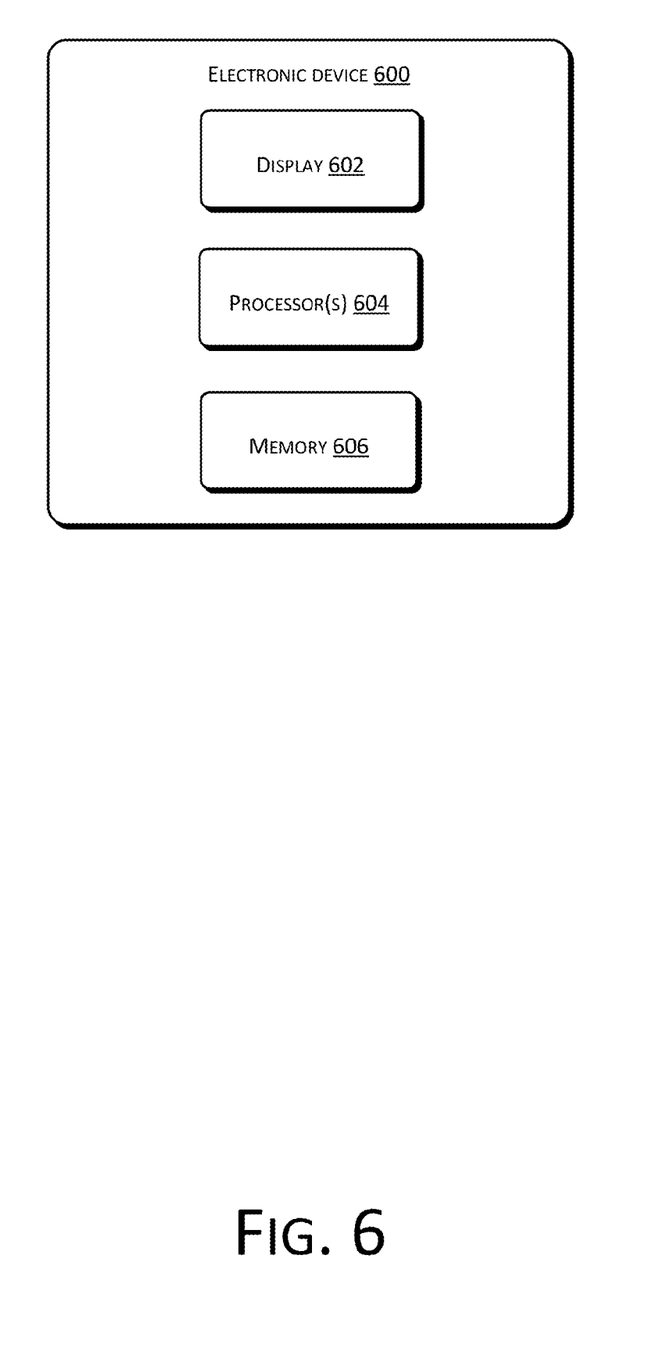
FIG. 6 is a schematic diagram of an illustrative electronic device in accordance with implementations of the present disclosure.

The implementations further include an electronic device. FIG. 6 shows schematic diagrams of an illustrative electronic device 600 in accordance with implementations of the present disclosure. The device 600 may include a display 602, processor(s) 604, and memory 606. The, memory 606 is configured to store an interface display program, the interface display program executed by the processor(s) 604 to acquire background information of an application page area adjoining to a system bar and configure background of the system bar based on the background information. The background information may include related information reflecting a background color of the application page area.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method comprising:
acquiring, by a computing device, background information of an application page area adjoining to a system bar, the background information including related information reflecting a background color of the application page area, and the acquiring including:
traversing a plurality of controls of the application page,
determining, for an individual control of the plurality of controls of the application page, whether the individual control is a control adjoining to the system bar based on information of a display location of the individual control on an interface that displays at least the application page area, and
acquiring background information of the individual control in response to a determination that the individual control is the control adjoining to the system bar based on the information of the display location of the individual control on the interface, the acquiring background information of the individual control including reading, via the computing device, respective color values of a predetermined amount of pixels at the display location; and
configuring, by the computing device, a background of the system bar based on the background information, the configuring including determining a color for the background of the system bar by assessing the respective color values of the pixels and applying the color to the background of the system bar.

2. The method of claim 1, further comprising:
monitoring replacement of an application page of an application corresponding to the application page area on an interface,
wherein acquiring the background information of the application page area adjoining to the system bar comprises acquiring the background information of the application page area adjoining to the system bar with respect to a replaced application page of the application.

3. The method of claim 2, wherein monitoring the replacement of the application page on the interface comprises monitoring an application opening of the application or a switch between different pages of the application, or a combination thereof.

4. The method of claim 1, wherein the background information comprises a background picture or the background color of the application page area, and
wherein configuring the background of the system bar based on the background information comprises configuring a background picture or a background color of the system bar.

5. The method of claim 1, wherein:
when the system bar comprises a status bar located on a top of an interface displaying the application page area, the application page area adjoining to the system bar comprises a top control of the application page, and
when the system bar comprises a navigation bar at a bottom of the interface, the application page area adjoining to the system bar comprises a bottom control of the application page.

6. The method of claim 1, wherein the background information comprises a background picture, and the method further comprises:
prior to configuring the background of the system bar based on the background information, processing the background picture to make the background picture to be suitable as a background display of the system bar.

7. The method of claim 6, wherein processing the background picture comprises at least one of:
performing crop processing on the background picture to make one or more features of the background picture to be consistent with one or more features of the system bar, the one or more features of the background picture including a length or a height of the background picture, or a combination thereof;
performing stretching processing on the background picture to make the one or more features of the background picture to be consistent with the one or more features of the system bar; or
performing rotation processing on the background picture.

8. The method of claim 1, wherein configuring the background of the system bar based on the background information comprises:
setting a background color of the system bar to be transparent;
adding a blank control with a same size and at a same position of the system bar; and
configuring a background picture or a background color of the blank control based on the background information.

9. A device comprising:
one or more processors; and
memory to maintain a plurality of components executable by the one or more processors, the plurality of components comprising:
an application background acquisition module configured to acquire background information of an application page area adjoining to a system bar, the background information including related information reflecting a background color of the application page area, and the application background acquisition module including:
a traversal control submodule configured to traverse a plurality of controls of the application page,
a judgment adjacent submodule configured to determine, for an individual control of the plurality of controls of the application page, whether the individual control is a control adjoining to the system bar based on information of a display location of the individual control on an interface that displays the application page area, and
a background information acquisition submodule configured to acquire the background information of the individual control in response to a determination that the individual control is the control adjoining to the system bar based on the information of the display location of the individual control on the interface, the background information acquisition submodule reading, via the computing device, respective color values of a predetermined amount of pixels at the display location, and
a system bar background setting module configured to configure a background of the system bar based on the background information, the system bar background setting module determining a color for the background of the system bar by assessing the respective color values of the pixels and applying the color to the background of the system bar.

10. The device of claim 9, wherein the plurality of components further comprise:
a page replacement monitoring module configured to monitor a replacement of an application page of an application corresponding to the application page area on an interface, and wherein the application background acquisition module is further configured to acquire the background information of the application page area adjoining to the system bar with respect to a replaced application page after the page replacement monitoring module detects the replacement of the application page.

11. The device of claim 10, wherein the page replacement monitoring module comprises one or more of an application opening monitoring submodule configured to monitor an application opening of the application or a page switching monitoring submodule configured to monitor a switch between different pages of the application.

12. The device of claim 9, wherein the background information comprises a background picture or the background color of the application page area, and the system bar background setting module is configured to further configure a background picture or a background color of the system bar based on the background information.

13. The device of claim 9, wherein:
when the system bar comprises a status bar located on a top of an interface that displays at least the application page area, the application page area adjoining to the system bar comprises a top control of the application page; and
when the system bar comprises a navigation bar at a bottom of the interface, the application page area adjoining to the system bar comprises a bottom control of the application page.

14. The device of claim 9, wherein the background information further comprises a background picture, and wherein the device further comprises:
an image processing module configured to process the background picture to make the background picture to be suitable as a background display of the system bar before triggering the system bar background setting module.

15. The device of claim 14, wherein the image processing module comprises at least one of:
a crop processing submodule configured to perform crop processing on the background picture to make one or more features of the background picture to be consistent with one or more features of the system bar, the one or more features of the background picture comprising a length, or a height of the background picture, or a combination thereof;
a stretching processing submodule configured to perform stretching processing on the background picture to make the one or more features of the background picture consistent with the one or more features of the system bar; or a rotation processing submodule configured to perform rotation processing on the background picture.

16. The device of claim 9, wherein the system bar background setting module is further configured to configure a background picture or a background color of the system bar by calling a background setting interface associated with the system bar and provided by a system associated with the device.

17. The device of claim 9, wherein the system bar background setting module comprises:
a system bar transparent setting submodule configured to set a background color of the system bar to be transparent;
a blank control adding submodules configured to add a blank control with a same size and at a same position of the system bar; and
a control background setting submodule configured to configure a background picture or a background color of the blank control based on the background information.

18. An electronic device comprising:
a display;
one or more processors; and
memory to maintain a plurality of components executable by the one or more processors to perform acts comprising:
acquiring background information of an application page area adjoining to a system bar, the background information comprising related information reflecting a background color or a background picture associated with the application page area, and the acquiring including:
traversing a plurality of controls of the application page,
determining, for an individual control of the plurality of controls of the application page, whether the individual control is a control adjoining to the system bar based on information of a display location of the individual control on an interface that displays at least the application page area, and
acquiring background information of the individual control in response to a determination that the individual control is the control adjoining to the system bar based on the information of the display location of the individual control on the interface, the acquiring background information of the individual control including reading, via the computing device, respective color values of a predetermined amount of pixels at the display location, and
configuring background of the system bar based at least in part on the background information, the configuring including determining a color for the background of the system bar by assessing the respective color values of the pixels and applying the color to the background of the system bar.

* * * * *